May 30, 1961   W. W. SCHULTZ   2,986,635
RADIATION DETECTOR
Filed March 30, 1956

Inventor:
Warner W. Schultz,
by Merton D. Moore
His Attorney.

2,986,635
Patented May 30, 1961

2,986,635
RADIATION DETECTOR
Warner W. Schultz, Schenectady, N.Y., assignor to General Electric Company, a corporation of New York Filed Mar. 30, 1956, Ser. No. 575,065

7 Claims. (Cl. 250—71.5)

This invention relates to an apparatus for detecting nuclear radiation. More specifically, it relates to an apparatus which utilizes a scintillating element for detecting the radiation.

By the expression nuclear radiation, there are meant atomic and nuclear particles of all types, masses, as well as quanta. Within the scope of this expression are included alpha particles, beta particles, gamma rays and neutrons.

One well known apparatus for detecting and measuring such nuclear radiation is the so-called scintillation counter. Devices of this type include, as the radiation sensitive detecting element, either crystalline scintillating phosphors, such as anthracene, naphthalene, thallium activated sodium iodide and thallium activated potassium iodide, or scintillating fluids consisting of an organic solute such as p-terphenyl in toluene as a solvent. The detecting element when subjected to the nuclear radiation produces a short burst light or scintillation for each event. The radiation sensitive detecting element is positioned adjacent to a photomultiplier tube so that the light scintillations produced by the impinging radiation is intercepted by the photoelectric cathode of the photomultiplier. The photomultiplier tube produces, in a well known manner, an electrical output signal for each light scintillation emitted by the detecting element. These electric signals may then be counted in an electronic circuit to provide an indication of the amount of nuclear radiation impinging on the radiation sensitive detector.

While these prior art devices have generally functioned in a satisfactory manner, it has been found that the sensitivity of these instruments is quite low. This lack of sensitivity can be attributed to the characteristics of the scintillating elements and of the photomultiplier tube. Present day photomultiplier tubes have a serious "noise" background at room temperature which produces current flow in the tube even though the cathode of the multiplier has substantially no light impinging thereon. This random current flow when the multiplier is in its de-energized condition is normally denominated as the "dark current" of the photomultiplier. Furthermore, scintillating elements, as presently known, produce light scintillations of a fairly low order of magnitude. Thus, random noise pulses originating within the photomultiplier device are often of a magnitude of the same order as those produced by the light scintillations. As a result, the signal-to-noise ratio of the photomultiplier device is very low and often prevents the detection of low energy radiation since the light scintillation produced thereby is of a low order of magnitude.

One prior art technique for improving sensitivity contemplates reducing the random noise pulses produced within the photomultiplier by cooling the photomultiplier tube to a low temperature at which the frequency of occurrence of such random noise pulses becomes insignificant compared to the signal produced by the light scintillations.

Another prior art technique for increasing the sensitivity of a scintillation counter contemplates the use of a discriminating means in the electronic counting circuit, which discriminating means prevents current pulses under a certain magnitude from being counted. In this fashion, a number of random noise pulses are eliminated. However, this approach is of limited utility since the smaller pulses due to weak scintillations are eliminated along with some of the noise pulses.

Yet another prior art system contemplates the use of coincidence circuits to eliminate those random pulses due to the photomultiplier tube characteristics.

In all of these prior art devices, the approach has been to stabilize either the photomultiplier tube or to provide electronic equipment which eliminates the random noise pulses. As a result, these prior art devices have been complex and relatively expensive, while yet providing only a limited increase in sensitivity.

Another possible and more promising approach, which is the one utilized in the instant invention, is to provide a scintillating element which produces light scintillations of an order of magnitude greater than any yet hitherto available.

It is an object of this invention, therefore, to produce a scintillation counter of increased sensitivity which is yet simple and inexpensive.

Another object of this invention is to provide a scintillating element which produces light scintillations of increased magnitude when subject to nuclear radiation.

Briefly speaking, the invention contemplates increasing the sensitivity of a scintillation detector and, consequently, of a scintillation counter, by applying an electric field to the scintillating element to increase the magnitude of the light scintillation produced by impinging nuclear radiation.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 represents a schematic showing of a scintillation counter incorporating one embodiment of this invention;

Figure 1:
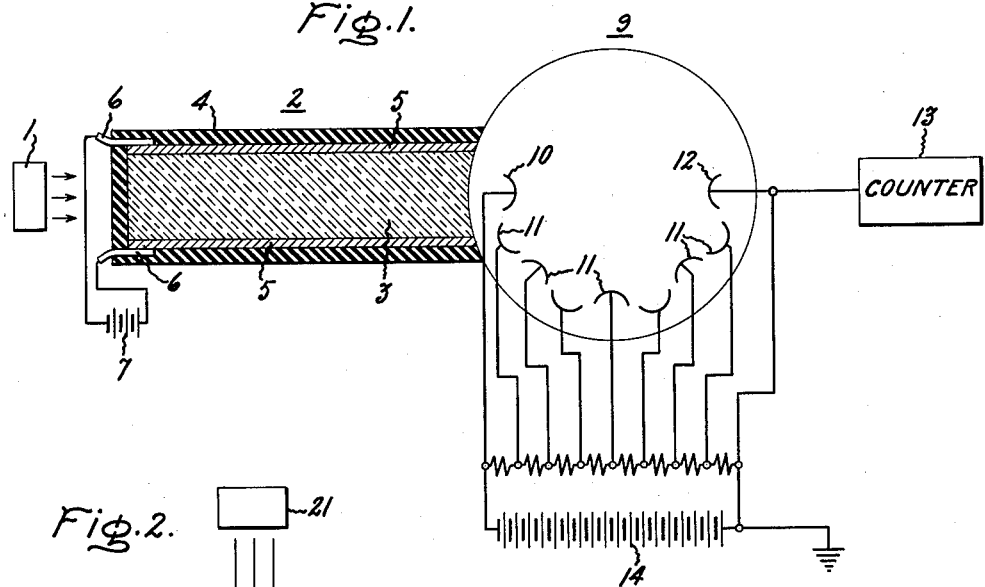

Referring now to Fig. 1, there is shown a scintillation counter including luminescent means which produces light scintillations when subject to incident nuclear radiation. A source of electrical energy is applied to the luminescent means to intensify the magnitude of the light scintillations produced by impinging nuclear radiation. A source of nuclear radiation 1 is positioned so that its radiation impinges on a radiation sensitive element 2 to produce light scintillations in response thereto. The radiation sensitive element 2 is positioned adjacent to a photomultiplier tube 9 which transforms the light scintillations into electrical pulses which are counted by a counting device 13.

The radiation sensitive device 2 comprises a scintillating phosphor 3 positioned within a casing or enclosing shell 4 made of electrical insulating material. Radiation impinging on the phosphor 3 will cause it to emit bursts of light commonly known as scintillations. Therefore, the material of the casing must be selected so as to be opaque to light whereby introduction of light from the outside is eliminated while yet being transparent to the nuclear radiation. Many materials of the character known broadly as "plastics," as well as several metals, have the suitable characteristics of being opaque to light and transparent to nuclear radiation and may, therefore, be utilized in forming the casing 4.

In order to increase and intensify the magnitude of the light scintillations produced by the impinging radiation, it is desirable to provide an electric field across the scintillating phosphor 3. To this end, a pair of metallic electrodes 5 are positioned on opposite faces of the phosphor. The electrodes may be applied by means of vapor deposition of a metal or any other similar technique. A pair of terminals 6, extending through the casing 4, are connected to the electrodes 5 and to a source of D.C. voltage 7 to provide the electric field across the scintillating phosphor.

One end of the improved radiation sensitive element 2 is disposed adjacent to a photomultiplier tube 9 of the type known as the RCA 1P21 or 5819. The detector 2 is so disposed relative to the photomultiplier 9 that light scintillations produced by impinging nuclear radiation are directed onto the photoelectric cathode 10 of the photomultiplier tube. The photomultiplier 9 consists, in addition to a photoelectric cathode 10, of a number of shaped secondarily emissive dynodes 11 and an anode member 12. A source of voltage 14, one end of which is grounded, and a potentiometer connected thereacross provides operating voltage for the photomultiplier tube 9. The cathode 10 and the anode 12 are connected to opposite ends of the potentiometer and are maintained respectively at relative negative and positive potentials. The dynodes 11 are connected to a number of discrete intermediate points along the potentiometer and are consequently maintained at successively more positive potentials than the cathode.

When nuclear radiation impinges on the scintillating phosphor 3 of the radiation sensitive element 2, a light scintillation is produced. The light from the scintillation reaching the cathode 10 of the photomultiplier causes the ejection of a number of photoelectrons, each of which strikes, by virtue of the electric field and the configuration of the tube elements, the first dynode 11 and causes the ejection of a number of secondary electrons. These secondary electrons in turn strike the second dynode, again liberating several electrons for each impinging electron. This process is repeated at all of the dynode elements 11 within the tube until a large stream of electrons arrive at the anode member 12 causing it to become very negative and producing a negative pulse in its output. The negative pulses are applied to a counting means 13 which indicates the number of pulses produced per unit time and thus provides a measure of the counting rate.

By virtue of the electric field applied to the electrode 5 from the source of voltage 7, the individual light scintillations produced in the phosphor 3 by impinging radiation is greatly intensified and, as a consequence, the output from the photomultiplier tube 9 is increased. The pulses produced under such circumstances are of a much higher order of magnitude than those produced by scintillating phosphors without such an applied electric field. Thus, the impinging nuclear radiation can easily be distinguished from the random "dark current" noise pulses produced within the photomultiplier. As a result, radiations of a very low energy level may easily be detected by means of this apparatus.

Figure 2:
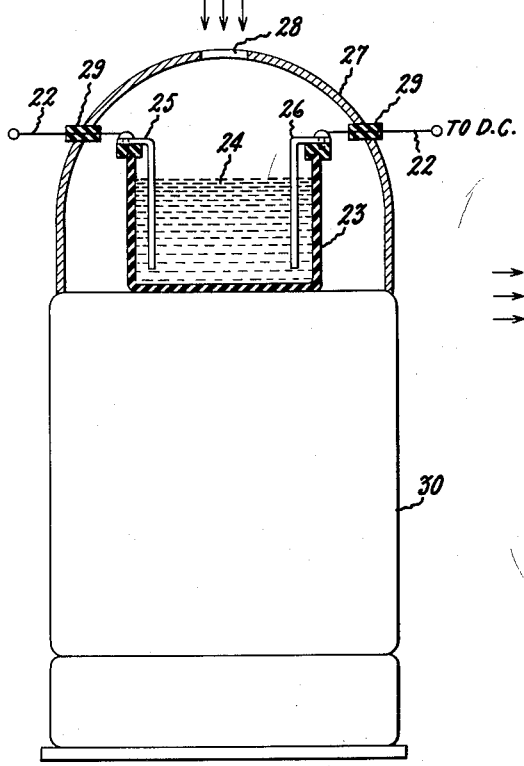
Fig. 2 shows an alternative embodiment incorporating a scintillating fluid.

In an alternative embodiment, as illustrated in Fig. 2, there is shown an apparatus in which the radiation sensitive element is a liquid scintillation phosphor. Liquid scintillation phosphors are a select class of compounds or solutes dissolved in a solvent such as toluene, which are notable because a significant fraction of their excited molecules lose energy by light emission. An example of such a solute is p-terphenyl, although many other compounds of this nature are available and known to one skilled in the art.

Referring now to Fig. 2, a glass beaker 23 containing a scintillating solution 24 is positioned on the flat cathode of an erect photomultiplier 30. A hemispherical reflector 27 of aluminum or titanium dioxide or metallized glass is positioned on the photomultiplier tube 30 and reflects the light scintillations from the solute 24 onto the photocathode of the tube 30. The reflector 27 is provided with an opening 28 to permit passage of nuclear radiation from a source 21. Positioned within the glass beaker 23 containing the scintillating solute 24 are a pair of electrodes 25 and 26. The electrodes 25 and 26 are connected by means of the leads 22 to a source of D.C. voltage, not shown, to provide an electric field across the scintillating solute 24. Insulating bushings 29 are provided in order to insulate the leads 22 from the metallic hemispherical shell 27.

In a manner similar to that described with reference to Fig. 1, nuclear radiation from the source 21 impinges on the scintillating solute 24 and produces light scintillations therein. The electric field produced by the electrodes 25 and 26 and the associated source of D.C. voltage provides an increase in the order of magnitude of these light scintillations. The light scintillations reaching the photocathode of the photomultiplier tube 30 produce electron multiplication therein and produce an output pulse indicative of the nuclear radiation. These pulses are counted in order to give an indication of the amount of radiation present.

In detecting the emission from alpha emitters, such as polonium or plutonium, or low energy beta emitters, such as $Ni^{63}$ or $H^3$, or the like, it may be additionally desirable to place the emitting material directly in contact with the scintillating phosphor or to disperse it throughout the phosphor.

Figure 3:
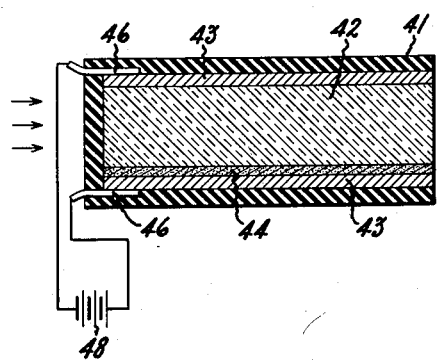
Fig. 3 shows a third embodiment of a scintillating detector utilizing a layer of radioactive material.

Referring now to Fig. 3, there is shown another alternative embodiment in which, in addition to providing an electric field, a layer of alpha or beta emitting material is positioned directly adjacent to the scintillating phosphor. A light impervious casing 41 contains a scintillating phosphor crystal 42 which, as explained previously, produces light scintillations when nuclear radiations impinge thereon. Adjacent to one surface of the phosphor 42 is a metallic electrode 43 which may be produced by means of vapor deposition. Adjacent the opposite face of the crystal is a layer 44 of low energy alpha or beta emitting material of the types previously mentioned. A second electrode 43 is positioned adjacent to the emitting layer 44 and may similarly be vapor deposited thereon. A pair of terminals 46 provide electrical contact with the electrodes 43 and extend through the casing 41 for connection to a source of D.C. voltage 48.

As explained with reference to Fig. 1, the D.C. voltage in conjunction with the electrodes 43 produces an electric field across the scintillating phosphor 42 and produces an increase in the order of magnitude of the light scintillations produced by the impinging radiations. Inasmuch as the radiation emitting material is positioned in direct physical contact with the scintillating phosphor 42, a large portion of the emitted radiation will be intercepted by the crystal to produce light scintillations. This factor in conjunction with the increase in the magnitude of the light scintillations produced by the electric field across the scintillating phosphor increases the sensitivity and permits the detection of low energy alpha or beta particles. One end of the radiation sensitive detector may, in a fashion similar to Fig. 1, be positioned adjacent to a photomultiplier tube in order to produce electrical output pulses as a measure of the radiation.

As will be evident from the foregoing description, certain aspects of my invention are not limited to the particular details of construction of the illustrated example, and I contemplate that various other modifications and applications of the invention will occur to those skilled in the art. It is, therefore, my intention that the appended claims shall cover such modifications and applications as do not depart from the true spirit and scope of this invention.

What I claim as new and desire to secure by Letters Patent of the United States is:

1. In a nuclear radiation detector, the combination comprising radiation sensitive scintillating luminescent means for producing light scintillations when subject to nuclear radiation, a source of unidirectional electrical energy continuously applied to said luminescent means to provide an electric field to intensify the magnitude of the individual light scintillations produced in response to each nuclear event.

2. In a nuclear radiation detector, the combination comprising a crystalline radiation sensitive scintillating luminescent means for producing light scintillations when subject to nuclear radiation, a pair of electrodes in physical contact with said luminescent means, a source of unidirectional electrical energy continuously connected to said electrodes adapted to interact with the impinging radiations to provide an electric field across said luminescent means to intensity the magnitude of the individual light scintillations produced in response to each nuclear event.

3. In a nuclear radiation detector, the combination comprising an outer casing opaque to visible light but transparent to nuclear radiation, a scintillating phosphor positioned within said casing adapted to produce individual light scintillations in response to the individual nuclear events comprising said radiation, a pair of metallic electrodes in physical contact with said scintillating phosphor, a source of D.C. voltage continuously connected to said electrodes to provide an electric field across said scintillating phosphor adapted to interact continuously with the impinging radiations to intensify the magnitude of the individual light scintillations.

4. In a nuclear radiation detector, the combination comprising a radiation sensitive scintillating liquid adapted to produce individual light scintillations in response to individual nuclear events, and means to apply a unidirectional electric field continuously to said scintillating liquid so as to intensify the magnitude of the light scintillations produced by said scintillating liquid in response to the individual nuclear events.

5. In a nuclear radiation detector, the combination comprising a radiation sensitive scintillating luminescent means for producing light scintillations when subject to nuclear radiation, radioactive means in direct physical contact with said luminescent means to subject it to nuclear radiation, and a source of unidirectional energy applied continuously to said luminescent means to provide an electric field thereacross adapted to interact continuously with said impinging radiation to intensify the individual magnitude of the light scintillations produced by said luminescent means in response to the individual nuclear events comprising the radiation emitted from said source.

6. In a nuclear radiation detector, the combination comprising an outer casing opaque to visible light but transparent to nuclear radiation, a scintillating phosphor positioned within said casing, radioactive means emitting nuclear radiation in direct physical contact with said scintillating phosphor, a pair of metallic electrodes, and a source of D.C. voltage continuously connected to said electrodes to provide an electric field across said scintillating phosphor adapted to interact continuously with the impinging radiation to intensify the magnitude of the individual light scintillations produced by said phosphor in response to the individual nuclear events comprising the nuclear radiation emitted from said source.

7. In a nuclear radiation detector, the combination comprising a radiation sensitive luminescent means for converting the kinetic energy of impinging nuclear radiation to light scintillations, means for providing additional energy to said luminescent means to enhance the intensity of the light scintillations including means to provide a unidirectional electric field across a portion of said luminescent means to interact with the converted kinetic energy of the impinging radiation to intensify the magnitude of the individual light scintillations produced by said luminescent means.

References Cited in the file of this patent

UNITED STATES PATENTS

| 2,060,977 | De Boer et al. | Nov. 17, 1936 |
| 2,225,044 | George | Dec. 17, 1940 |
| 2,648,012 | Scherbatskoy | Aug. 4, 1953 |
| 2,692,948 | Lion | Oct. 26, 1954 |
| 2,739,243 | Sheldon | Mar. 20, 1956 |
| 2,747,131 | Sheldon | May 22, 1956 |
| 2,750,514 | Armistead | June 12, 1956 |
| 2,768,307 | Trico | Oct. 23, 1956 |
| 2,772,368 | Scherbatskoy | Nov. 27, 1956 |
| 2,780,731 | Miller | Feb. 5, 1957 |
| 2,835,822 | Williams | May 20, 1958 |
| 2,841,730 | Piper | July 1, 1958 |
| 2,857,522 | Jones | Oct. 21, 1958 |
| 2,880,346 | Nicoll et al. | Mar. 31, 1959 |
| 2,885,562 | Marinace et al. | May 5, 1959 |
| 2,909,703 | Williams | Oct. 20, 1959 |

OTHER REFERENCES

De Ment: Fluorochemistry, Chemical Publishing Co., Inc., Brooklyn, New York, 1945, pp. 295–296.

Electroluminescence and Related Topics, Destriau et al., Proceedings of I.R.E., vol. 43, No. 12, December 1955, pages 1912–1940.